Figure 1:
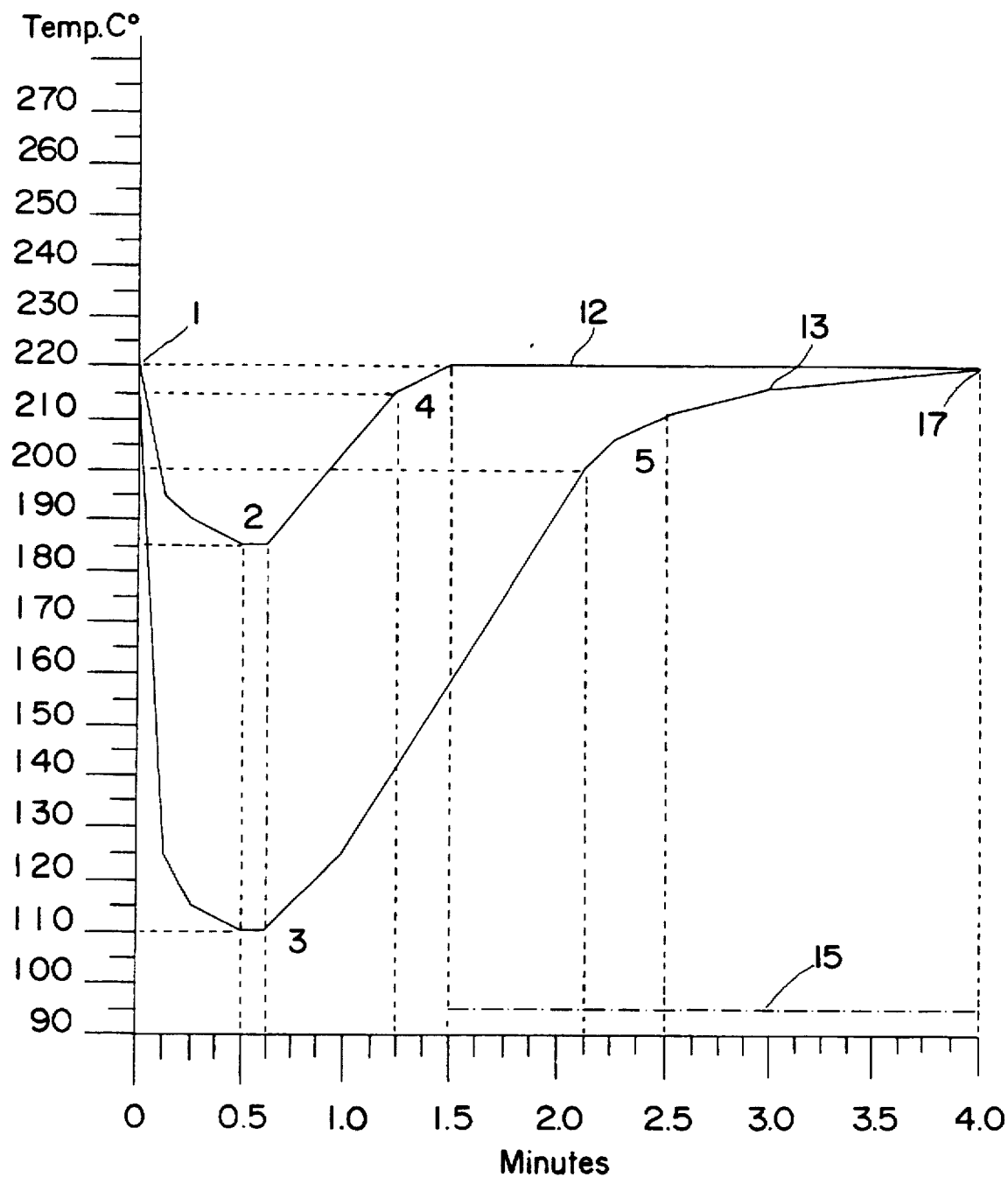

United States Patent [19]

Hansson

[11] Patent Number: 5,780,818
[45] Date of Patent: Jul. 14, 1998

[54] METHOD OF AUTOMATICALLY COOKING FOOD WITH FORCED HOT AIR

[76] Inventor: Bengt H. Hansson, Hults Gata 73, S-436 44 Askim, Sweden

[21] Appl. No.: 727,490

[22] PCT Filed: Apr. 7, 1995

[86] PCT No.: PCT/SE95/00380

§ 371 Date: Jan. 13, 1997

§ 102(e) Date: Jan. 13, 1997

[87] PCT Pub. No.: WO95/27399

PCT Pub. Date: Oct. 19, 1995

[30] Foreign Application Priority Data

Apr. 7, 1994 [SE] Sweden ............... 9401155-8

[51] Int. Cl.[6] ........................................... H05B 1/02
[52] U.S. Cl. .................. 219/494; 219/497; 219/707; 99/325; 236/44 C
[58] Field of Search ............... 219/492, 497, 219/505, 506, 707, 710, 508; 236/44 C, DIG. 8; 99/325, 326, 327, 329, 331, 332; 340/588, 589

[56] References Cited

U.S. PATENT DOCUMENTS

| | | |
|---|---|---|
| 4,281,022 | 7/1981 | Buck . |
| 4,379,964 | 4/1983 | Kanazawa et al. ............ 219/497 |
| 4,484,065 | 11/1984 | Ueda ............................ 219/492 |
| 4,812,622 | 3/1989 | Takeda et al. . |
| 4,920,948 | 5/1990 | Koether et al. . |
| 5,324,917 | 6/1994 | Boyer et al. .................. 219/497 |
| 5,349,163 | 9/1994 | An ............................... 219/492 |
| 5,410,129 | 4/1995 | Kersten et al. ................ 219/495 |
| 5,552,584 | 9/1996 | Idebro .......................... 219/707 |

FOREIGN PATENT DOCUMENTS

| | | |
|---|---|---|
| 0508288 | 10/1992 | European Pat. Off. . |
| 0568362 | 11/1993 | European Pat. Off. . |
| 2552628 | 4/1985 | France . |

*Primary Examiner*—Mark H. Paschall
*Attorney, Agent, or Firm*—Dvorak & Orum

[57] ABSTRACT

An automatic control system for regulating the cooking process of a food product where it reaches the desired result respective of the initial temperature of the food product, its moisture content or quality. The invention solves the problem by using the characteristic breakpoints (2,3,4,5) that, whereby the adding of heat, occurs on one or two temperature curves (12,13) obtained at different measuring points, when the temperature again rises after the temperature drop of the heat transportation of medium after the insertion of the food product with a lower temperature than the heat transportation medium or when water transites from solid to liquid form (2,3) and from liquid form to steam (4,5).

11 Claims, 4 Drawing Sheets

METHOD OF AUTOMATICALLY COOKING FOOD WITH FORCED HOT AIR

It is a know fact that one by preparing food in an oven for each individual food product must set the temperature and time controls. These parameters vary according to the type of product placed in the oven and its volume. Additionaly the temperature of the foodproduct when starting the process affects the amount of time necessary for the process. The setting of these two basic parameters is generally a matter of subjective judgement and/or based on experience. The oven temperature is mostly controlled by a temperature controlling device with the purpose of keeping the set cooking temperature as constant as possible.

Apart from these basic settings there is often a need for, when processing certain types of foodproducts, removing water in the form of water vapour, and again in other cases adding water vapour. The settings of these parameters are mainly done manually by a through the entire cooking process engaged function of removing or adding water vapour. The settings can also be in advance fixed controlling programs.

These drawbacks are particularly troublesome when repetitly processing varying volume of the same type of foodproduct. This is the case often found in catering environments.

As one example among many others the course of events when processing french fries can be described as follows;

In a rotating hot air oven a continuously varying volume of french fries is processed in hot air. Initially the french fries being cooked gives off large amounts of water vapour that helpes thawing by allowing increased heat transport, but at a later stage the vapour can prevent a crisp surface being reached. The time of processing varies in accordance to the volume of french fries being processed and the amount of water vapour given off. The amount of water vapour given off is dependent on how the frozen or refrigerator chilled french fries is manufactured, frozen or stored. It is obvious that it is virtually impossible to manualy set all the required parameters needed for reaching a nicely tasting product.

Having to do this by subjective judgments in a stressful work environment very often results in mistakes giving that given quality demands is not reached or even that the food product is destroyed.

The present invention eliminates demand for continous new settings and thereby the risc of failure.

The invention is based on the fact that a food product to be cooked in heat always starts off at a lower temperature than the temperature of the heat transportation medium into which the food product is placed. This results in caracteristic changes in shape of the temperature curve of the heat transportation medium when the food product is placed into it.

Figure 2:
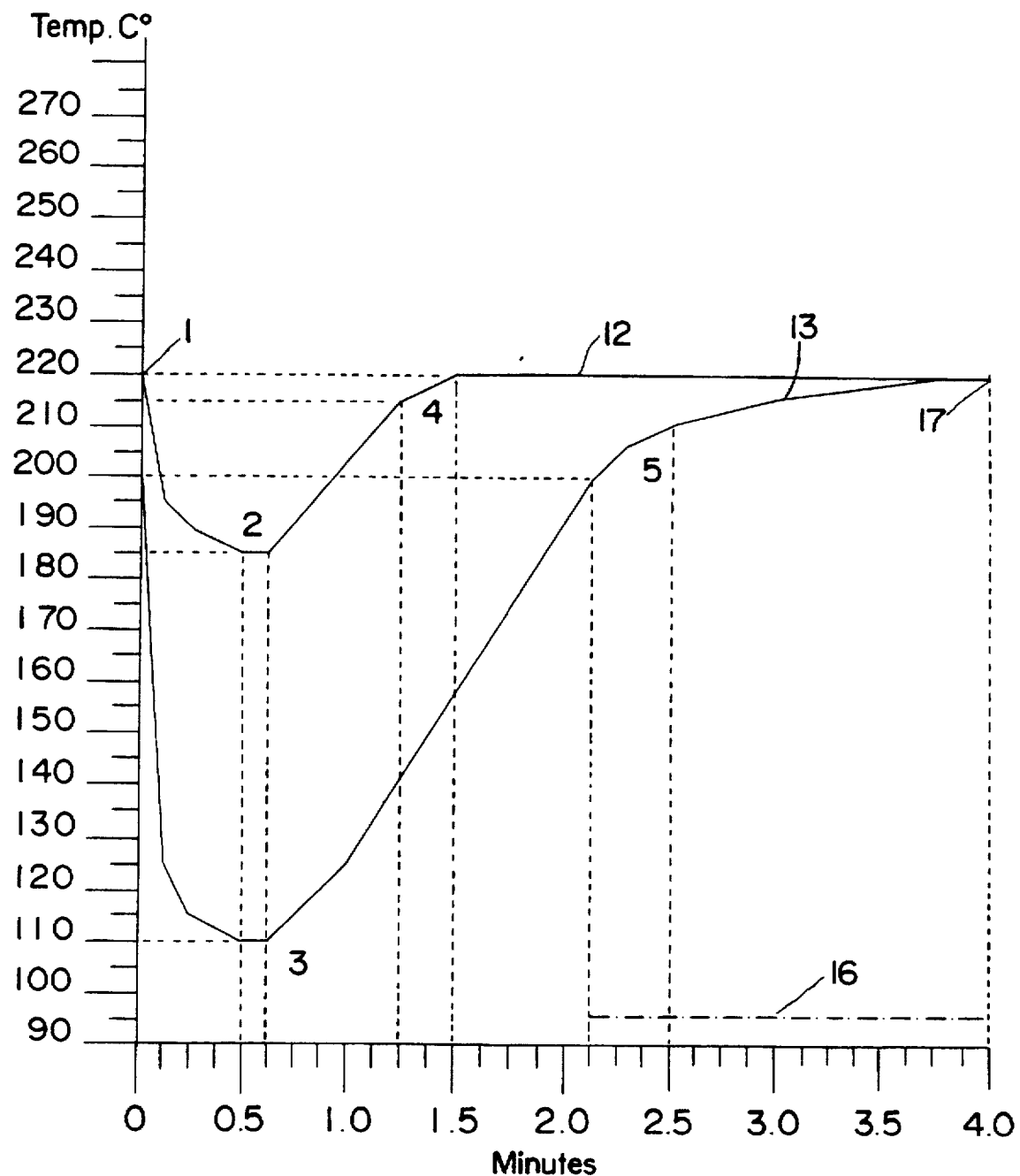
Figure 3:
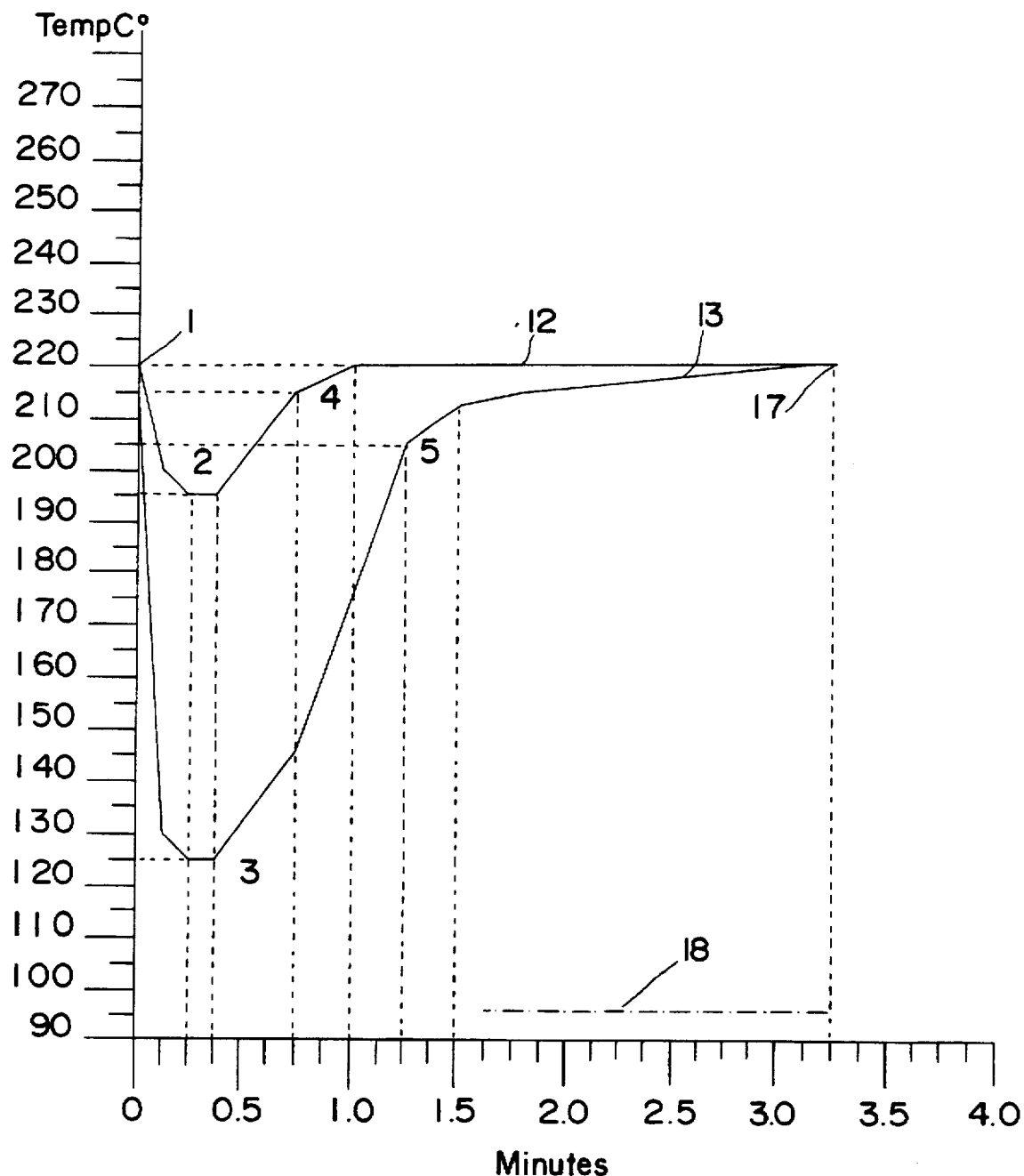

On the enclosed drawings,

FIGS. 1 to 3, curves are shown illustrating temperature changes over time.

Figure 4:
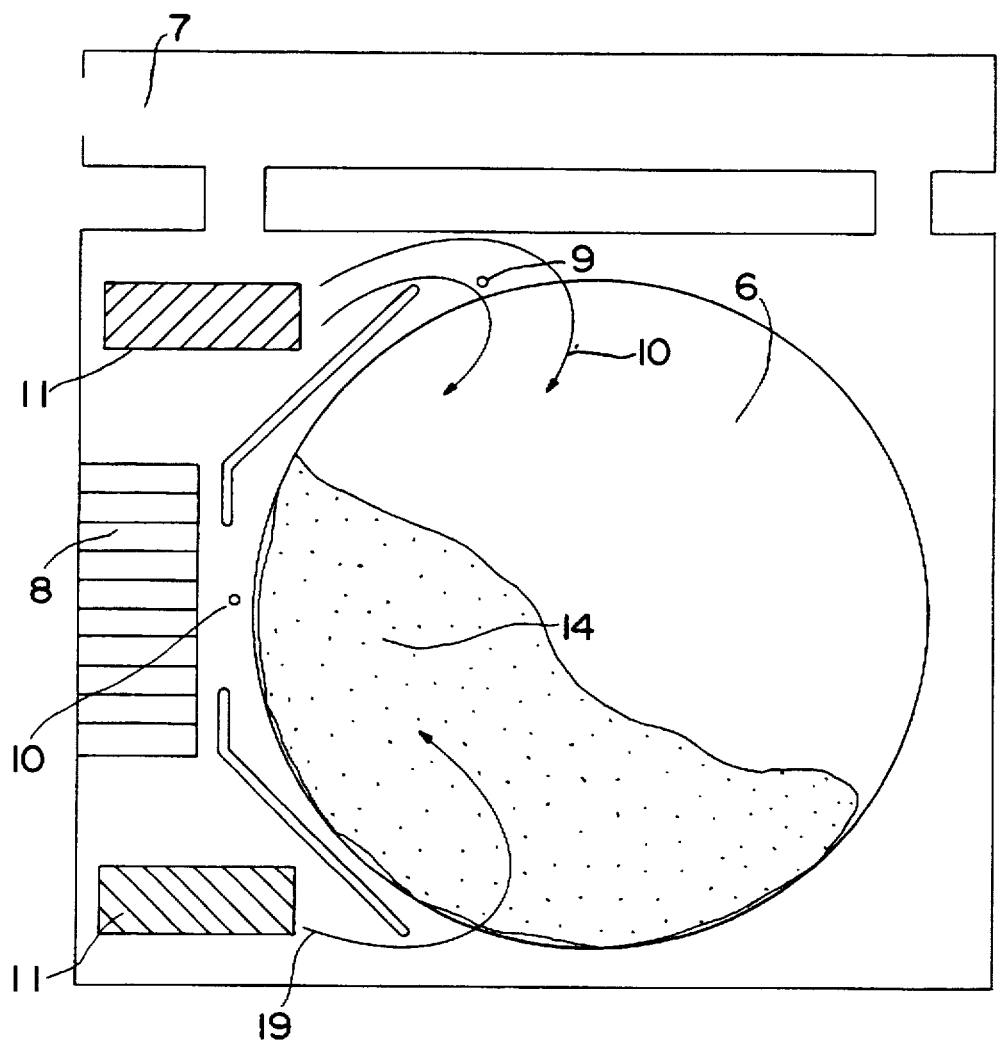

FIG. 4 shows a general outline of an oven for processing chilled or frozen food e. g. french fries.

The caracteristic changes in shape of the temperature curve is seen as breaking points which depend on differences in the initial temperature of the food product, the water content in the form of water or ice, the specific heat of the inserted food products or a combination of these different properties. When a frozen product is placed in the oven, two very characteristic breakpoints, 2 or 3 together with 4 or 5, are obtained. Where the first one, 2 or 3 appears the ice transites into water (melting point) and where the other, 4 or 5, appears, the water transites into steam (boiling heat). These break points can therefore be used for controlling amongst other things a device which regulates the amount of water vapour in the heat transportation medium circulating in the oven compartment. Most food products are in the initial stages of the cooking process, especially when frozen but even cold, almost unaffected by a heat transportation medium saturated with water vapour. A heat transportation medium saturated with watervapour is able to carry larger amounts of heat compared to a dry heat transportation medium. These conditions can be used to rapidly raise the temperature of the french fries. When inserting a chilled food product a quick and substantial temperature drop in the vapour saturated heat transportation medium circulating in the ovencompartment occurs. This drop appears despite the by the heating device continuosly added heat. This is independent of whether the food product is frozen, in which case the breakpoint of the temperature curve is found in the lower parts of the temperature scale, or the food product is room temperature, in which case the break point of the temperature curve is found in the upper part of the temperature scale. The ventilator 7 connected to the oven compartment 6 is shut during the heating phase and thereby the heat transportation medium is saturated with water from either the food product or from the outside in the form of water or steam. Thereby the heat transportation medium manages to transport large amounts of heat, and it does not absorb more water and thereby not drying the food product.

The temperature can be measured at several points along the path 19 of the heat conducting medium, that is forced around by the fan 8 or an equivalent device. These measuring points produce different temperature curves according to where in the heat transportation medium the readings are taken. The biggest disparity is seen between the two curves whos temperatures are measured after the passage through the heating devices (oven temperature that is), measuring point 9, and after the passage past or through the food product before the heating elements (intace temperature that is), measuring point 10. It is a caracteristic that for any given food product, the shape of the temperature curves will be constant and that these curves always are situated in a fixed position inbetween. The curvforms show, dependent on the inserted volume of food product a significant expansion or compression along the time or temperature axis without changing the information in the curves. Compare FIGS. 1 and 2 that applies for a larger volume of food product with FIG. 3 that applies for a smaller volume of the same food product. When the oven temperature, that is the temperature of the circulating heat transportation medium after passage through the heating device 11, again reaches the desired value, equal to the maximum temperature allowed for a certain food product, it is for a vide range of food products necessary to reduce the water vapour of the heat transportation medium so as to avoid the food product absorbing water, render it soft and soggy. The after this phase added heat energy is mainly used for changing the surface of the food product e. g. brown it.

Having reached the pre-set temperature, the ventilator 7 is opened, expelling the water vapour saturated heat transportation medium during the period 15 from the breakpoint 4, and drawing in dry heat transportation medium for facilitating surface changes e. g. browning.

It has in many cases become apparent, that the preparation time can be reduced, together with a substantial raise in food product quality, if the heat treatment with hot air saturated with water vapour can continue for a little while longer after you have reached desired temperature, before letting the redudant water vapour out. The prolonging results in a higher temperature deeper in the food product which thereby have time to get thoroughly cooked. This can be done by a certain delay after the breakpoint 4, before opening the ventilator 7, or the ventilaton time 16 can start off from the breakpoint 5, or at a certain delay from this.

The shape of the curves, i. e. curve 12 showing the oven temperature and curve 13 showing the intake temperature, along the time axis is variable according to the volume of the food product being cooked as well as its temperature when placing it in the oven compartment. This means that if only one of the break points 4 or 5 is used for a proportionate control of the opening or closing of the ventilator 7 you get a control that does not allow correct expelling time for different volumes and temperatures of the inserted food product. However using the relations between the breakpoints 4 and 5 along the time axis and/or temperatur axis automatic control is attained, because information of both volume and temperature is obtained.

More accurate control can be achieved if data of the breakpoints 2 or 3 is used together with data of the breakpoints 4 or 5.

By measuring the rate of convergence of the curves 12 and 13 towards the convergence point 17 and comparing this with the relative positons of the breakpoints 2 or 3, and/or the breakpoints 4 or 5, it is possible to, independent of the volume and initial temperature, determine the total cooking time. This makes manually set cooking times according to some predetermined point on any of the temperature curves obsolete, a condition that used to be general practice.

The basic regulation of the automatic control system as described, is set irrespective of whether one or both of the temperature curves 12 or 13 is used. This basic control can be achieved by means of relays or microprocessors. The microprocessors offers greater flexibility because apart from its fixed memory (ROM) for its basic functions, additional changes can be made via a keyboard in the microprocessors flexible memory (RAM). A variety of changes can be made and stored in the computers memory. Thus the automatic control system can be programmed for a list of different, regulary used products. Via a control panel the operator can choose the programme for a given product and the process runs automatically independent of the initial temperature, volume or water content of the product to be cooked.

Position Numbers and Denomination of Details

The parenthesis behind the denomination describes on which figures the position numbers can be found.

1 Starting point (1, 2, 3)
2 Temperature curve breakpoint of oven temperature after temperature drop (1, 2, 3)
3 Temperature curve breakpoint measured after passage through or by the food product (1, 2, 3)
4 Temperature curve breakpoint of oven temperature when balance has reoccured (1, 2, 3)
5 Temperature curve breakpoint measured after passage throuh or by the food product (intake temperature) (1, 2, 3)
6 Oven compartment (4)
7 Ventilation device (4)
8 Fan (4)
9 Measuring point for oven temperature (4)
10 Temperature curve measuring point measured after passage through or by the food product (4)
11 Heating element (4)
12 Actual temperature curve (oven temperature) (1, 2, 3)
13 Temperature curve measured after passage through or by the food product (intake temperature) (1, 2, 3)
14 Food product (4)
15 Expelling time when basing control on temperature curve 12 (1, 2, 3)
16 Expelling time when basing control on temperature curve 13 (1, 2, 3)
17 Convergence point of the both temperature curves (1, 2, 3)
18 Airing time when basing control on the relation between the different breakpoints (3)
19 Course of the heat transportation medium (4)

I claim:

1. An automated method for controlling, in a forced air oven which uses heated air as a heat transport medium, a process for cooking and heating a food product placed within said oven, said process automatically adjusted according to characteristic parameters of the food product, said oven comprising an oven compartment, a fan for forcibly blowing air through said compartment, at least one heating element for supplying heat to the air, a ventilator connected to said oven compartment for communicating said air out of said oven compartment when said ventilator is in an open position and for retaining said air when in a closed position, a plurality of temperature detecting devices positioned within said oven compartment along a flow path of said hot air, said devices for measuring at least the air temperature of air displaced from said fan and after passage over and through said food product, and a control unit operably connected to each of said ventilator, temperature detecting devices and heating elements, said control unit including a multitude of pre-programmed temperature curves for different kinds of food products, wherein each of said respective temperature curves includes at least two phase-change points, one of said phase-change points defined as a sensed temperature where ice is converted to water and the second phase-change point defined as a sensed temperature where water is converted into steam, comprising the steps of:

closing said ventilator for retaining residual humidity within said oven compartment;

activating the fan and heating elements to force said saturated air to circulate about said oven compartment, whereby said heating elements heat said air to a desired temperature before said air is passed over said food product, said desired temperature a maximum temperature for said food product;

continuously measuring the temperature of the air at the points in the flow path immediately after the heating elements and immediately after said air has passed over the food product;

sending the measured temperatures in signal form to said control unit for comparing said measured temperatures to said temperatures two phase-change points on said pre-programmed temperature curve for the kind of food product being cooked;

maintaining the activation of the heating element if the measured temperature is not equal to at least one of the phase-change point temperatures;

opening said ventilator when said measured air temperature of the air which has passed over said food product is equal to said predetermined second phase-change point temperature, whereby said control unit ends said cooking process by deactivating said fan and heating elements.

2. The method for preparing food as claimed in claim 1, wherein the time of cooking is controlled by the water content in the heat transport medium by means of the cooking process being regulated by use of phase-change characteristics for water in a temperature curve which is measured after the heat transport medium has passed by the food product and when water changes phase from solid ice to liquid water and when said same water again chances phase from liquid to steam.

3. The method for preparing food as claimed in claim 1, wherein the process is regulated using phase change points in a first temperature curve which is measured after the heat transport medium has passed by the food product, and wherein the points on said first wave are compared to the phase-change points in a temperature curve which is measured before the heat transport medium passes by the food product when water changes phase from solid to liquid form and when water changes phase from liquid to steam.

4. The method for preparing food as claimed in claim 1, wherein control of the water content in the heat transport medium is regulated by comparing the phase change temperature points in the pre-programmed temperature curve to a temperature of the heat transport medium once it has passed the food product.

5. The method for preparing food as claimed in claim 1, wherein the temperature measurement of the heat transport medium is performed at two different points in the flow path, one point immediately after the heat transport medium passes the heating elements and the other after the heat transport medium passes the food product, whereby temperature curves are obtained, and used to regulate heat supply, ventilation and termination of food processing.

6. The method for preparing food as claimed in claim 1, wherein a convergence point between the pre-programmed temperature curve and the measured temperature curve of both curves is used for controlling the termination of food processing.

7. The method for preparing food as claimed in claim 1, wherein a control of the cooking process is regulated by a relationship between the pre-programmed and actually measured temperature curves obtained by comparative measurements performed along one of the time and temperature curves and the curves in combination.

8. The method for preparing food as claimed in claim 1, wherein a control of the cooking process is regulated using only the relationship between the pre-programmed and actually measured temperature curves by comparative measurements performed along one of the time and temperature axis and the curves in combination.

9. The method for preparing food as claimed in claim 1, wherein at least two phase-change points used at a time and in combination form a basis for regulating other functions than ventilation and duration.

10. The method for preparing food as claimed in claim 1, wherein use of the phase-change points occurs on the time and temperature axis of the temperature curves together as a basis for a time and temperature operating change.

11. The method for preparing food as claimed in claim 1, further including the step of maintaining activation of said heating elements until said air temperature within said oven compartment reaches said desired temperature in order to brown said food product.

* * * * *